Patented Apr. 11, 1944

2,346,599

UNITED STATES PATENT OFFICE 2,346,599

AZO DYE INTERMEDIATES

Arthur R. Murphy, deceased, late of Penns Grove, N. J., by Margaret R. Eastlack, formerly Margaret R. Murphy, administratrix, Penns Grove, N. J., and Swanie S. Rossander, Wilmington, Del., and Carlton W. Croco, Woodstown and John M. Tinker, Carneys Point, N. J., assignors to E. I. du Pont de Nemours & Company, Wilmington, Del., a corporation of Delaware No Drawing. Application February 23, 1938, Serial No. 192,062

7 Claims. (Cl. 260—507)

This invention relates to new compounds which are useful as intermediates in the manufacture of dyes, especially to new di(nitro-aroyl-amino)aroyl-amino-naphthols, di(nitro-aryl-sulfonyl-amino)aroyl-amino-naphthols, di(nitro-aroyl-amino)aryl-sulfonyl-amino-naphthols, di(nitro-aryl-sulfonyl-amino)aryl-sulfonyl-amino-naphthols and the reduction products thereof in which the nitro groups are reduced to amino groups.

It is among the objects of the invention to provide new intermediates from which dyes of improved substantivity and fastness to exposure and washing can be made. Another object of the invention is to provide compounds which can be used as diazo components or as coupling components. Another object of the invention is to provide compounds in which a plurality of diazotizable amino groups is available. Another object of the invention is to provide dyestuffs which have marked affinity for cotton, regenerated cellulose and similar compounds. Still other objects of the invention will be apparent from the following description.

The objects of the invention are attained generally by condensation of an amino naphthol compound with a di-nitro aroyl halide, reduction of the nitro groups, then condensation of this compound with a nitro-aroyl halide and reduction of the nitro. Instead of a di-nitro-aroyl halide a di-nitro-aryl-sulfon halide can be used; for the last condensation a nitro-aryl-sulfon halide can be used instead of a nitro-aryl-halide.

The invention is illustrated but not limited by the following examples:

Example 1

A. J-acid (2 - amino - 5-naphthol-7-sulfonic acid) is condensed with 3:5-di-nitro benzoyl chloride according to the following procedure.

Charge 2500 parts of water into a reaction vessel and heat to 80° C. Add 239 parts of J-acid and enough soda ash (53 parts) to make the solution just slightly alkaline to brilliant yellow paper. Add 163 parts sodium acetate. Melt 277 parts of 3:5 dinitro benzoyl chloride and add very slowly with agitation until benzoylation is complete. Maintain a temperature of 80° C. ±5° C. and keep the solution alkaline to Congo red paper by adding soda ash as necessary. When the benzoylation is complete, heat to 90° C. for half an hour, make just acid to Congo red with hydrochloric acid and filter. Work with three 100 part portions of boiling water. Blow the product to a 50% paste, yield—93.1% theory. The base may be dried at 110° C. or used as paste for reduction.

B. The product of A is cautiously added, during 2 to 3 hours as rapidly as reduction takes place, to a well stirred mixture of water (2000 parts), iron powder (290 parts), and acetic acid (10 parts), which is maintained at 95–100° C. Stir one hour longer at 95–100° C. The reduction mass is made alkaline to phenolphthalein with sodium carbonate. Ten parts of charcoal ("Darco") is added, and stirred 15 minutes before being filtered. Wash with 300 parts boiling water. The product is then isolated by adding hydrochloric acid to the filtrate until just acid to Congo red paper. Cool to 30° C. Filter and blow the press until a 40 to 50% paste is obtained. The product can be dried at 90° C. or used as a paste in the following reaction.

C. Slurry 75 parts (100% basis) of the B product with 2000 parts of water in a reaction vessel. Make just alkaline to brilliant yellow paper with soda ash, heat to 60° C. Add 66 parts sodium acetate and stir 15 minutes. Add para-nitro benzoyl chloride (as a 20% solution in carbon tetrachloride) slowly, maintaining an alkaline reaction to Congo red paper by adding soda ash as necessary, and a temperature of 60° C., until the condensation is complete, as shown by the absence of test for a free amino grouping. Make strongly alkaline to brilliant yellow paper with sodium carbonate and heat at 90° C. for one hour. Add 200 parts of salt and stir half an hour. Filter at 70–80° C. Blow until a 40% paste is obtained.

The product may be represented by the formula

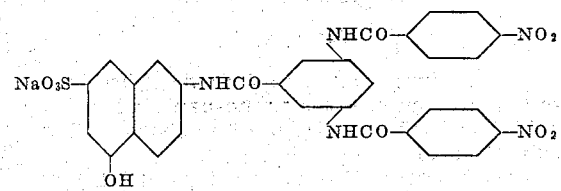

It is a yellow product.

Reduce sixty-seven (100% basis) parts of the product of C by a similar procedure to that described in B above. Sixty parts of iron, 2 parts acetic acid, 10 parts charcoal ("Darco") and soda ash, were added as necessary to give the desired end-points.

The product was isolated by acidification with hydrochloric acid until just acid to Congo red paper, cooled to 30° C. and filtered. It was dried at 90-95° C.

The product may be represented by the formula

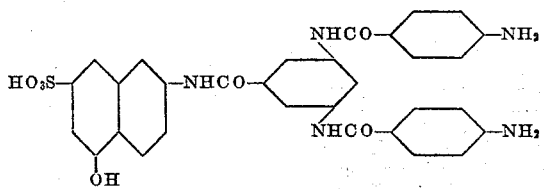

The latter product consisted of a white powder. It was insoluble in water and soluble in dilute sodium carbonate or caustic soda solutions.

The final reduction product of Example 1 was subjected to the action of a slight excess of nitrous acid in the presence of a strong mineral acid (HCl). The resulting solution showed the characteristic reactions of a diazotized amine. The diazo compound coupled with azo dye coupling components, such as beta naphthol, 2-naphthol-6-sulfonic acid and 2-amino-5-naphthol-7-sulfonic acid under the proper conditions of coupling, giving colored compounds.

The final reduction product of Example 1 has marked affinity for cellulose fiber from an alkaline solution. It was diazotized on the fiber by the customary treatment with acid and sodium nitrite and subsequently coupled with beta naphthol as a developing agent to give a bright orange dyestuff. Other developing agents may be used to give different shades of final dyestuff on the fiber, such as 1-phenyl-3-methyl-5-pyrazolone, aceto-acetanilide, meta-toluene-diamine and still others.

The compounds can also be used as coupling components and coupled to diazotized aryl amines, giving dyes of excellent brightness and washing fastness.

The developed dyes have brighter shades and better fastness to washing than dyes made from intermediates of the type (naphthol-sulfonic acid)-NHCO-aryl-(NH$_2$)$_2$. With the latter compounds, coupling occurs in both the naphthol and the aryl nuclei, and apparently clean cut couplings are not produced.

Example 2

The procedure of Example 1 were applied to the synthesis of a product, similar to that of Example 1, by substituting gamma acid (2-amino-8-naphthol-6-sulfonic acid) for J-acid, and the new products of interest N-N' (di-para-nitro-benzoyl) 3:5-diamino benzoyl gamma acid and N-N' (di-para-amino-benzoyl) 3:5-diamino benzoyl gamma acid were produced.

Example 3

In procedures similar to those described in the preceding examples, the amino-naphthol sulfonic acid consisted of 1-amino-8-naphthol 3:6-disulfonic acid.

Excepting for differences in the solubilities of the products and the colors of azo combinations, obtained by coupling them to diazotized aryl-amines, the products were, in general, similar to those described in the preceding examples.

Example 4

In a procedure similar to the preceding examples, the condensed products were made from S-acid (1-amino-8-naphthol-4-sulfonic acid). The products were similar to the products of the preceding examples except for slight differences in solubility and color of the azo combinations.

Example 5

The procedures of Example 1 were applied to the synthesis of a product, similar to that of Example 1, by substituting 2:4-dinitro-benzoyl chloride for the 3:5-dinitro-benzoyl chloride, and the new products of interest N,N'(di-para-nitro-benzoyl)-2:4-diamino-benzoyl-J-acid, and N,N'(di-para-amino-benzoyl)-2:4-diamino-benzoyl-J-acid were made. In general the products had the characteristics of the products of Example 1.

Example 6

The procedures of Example 1 were applied to the synthesis of a product, similar to that of Example 1, by substituting meta-nitro-benzoyl chloride for para-nitro-benzoyl chloride, and the new products of interest N,N' (di-meta-nitro-benzoyl)-3:5-diamino-benzoyl-J-acid and N,N'(di-meta-amino-benzoyl)-3:5-diamino-benzoyl - J - acid were made. These products were similar to the products of Example 1.

Example 7

The procedures of Example 1 were applied to the synthesis of a product, similar to that of Example 1, by substituting meta-nitro-benzene sulfon chloride for the para-nitro-benzoyl chloride, and the new products of interest N,N'(di-meta-nitro-benzene sulfonyl)-3,5-diamino-benzoyl-J-acid and N,N'(di-meta-amino-benzene sulfonyl)-3,5 - diamino - benzoyl - J - acid were made. In general the products had the characteristics of the products of Example 1.

Example 8

A. 600 parts of toluene and 100 parts of 1-amino-7-naphthol were charged into a reaction vessel. 181.5 parts of 3:5-dinitro-benzoyl chloride in 394 parts of ortho-dichlor-benzene were added. The mixture was heated slowly to reflux and held at reflux until no more hydrogen chloride was evolved, and then refluxed one hour longer. The toluene was distilled off. The residue in the vessel was added to 2000 parts of water and filtered. The filter cake was then slurried with 2000 parts of water, filtered and washed free of acid. The product was dried at 90° C. The yield was 224 parts.

B. 100 parts of the condensation product made in accordance with paragraph A were mono-sulfonated by adding the product to 400 parts of sulphuric acid monohydrate while stirring, and keeping the temperature below 45° C. After stirring for three hours the sulfonation mass was added to 2000 parts of ice and water to precipitate the sulfonated product, and filtered. The product was 3:5 - dinitro - benzoyl - 1 - amino-7-naphthol mono-sulfonic acid. This product can be dried, stored and reduced after having been dried, or the paste can be used instead of the dried product if it is desired to carry out the reduction without storage.

C. The nitro groups of this mono-sulfonated product were reduced to amino similarly to the procedure described in Example 1, part B.

D. The reduced product made in accordance with paragraph C was condensed with metanitro-benzoyl chloride and reduced by the procedure similar to that described in Example 1, part C. The final product was N,N'(di-m-aminobenzoyl) - 3:5 - diamino - benzoyl - 1 - amino-7-naphthol-mono-sulfonic acid. The properties of this product were similar to those of the preceding examples.

It is not necessary to use an amino-naphthol-sulfonic acid as the starting material. As illustrated in Example 8 one or more than one sulfonic acid group can be substituted into a nitro-aroyl-amino-naphthol or a nitro-arylsulfon-amino-naphthol by appropriate methods of sulfonation which are known to the art. After such sulfonation the nitro groups are reduced and the second condensation with a nitro aroyl halide or a nitro-aryl-sulfon halide is then carried out.

Instead of using an amount of nitro-benzene-sulfon-halide or an equivalent amount of nitro-benzoyl-halide to condense with the two amino groups of the diamino-aroyl-amino-naphthol, one molecule of nitro-benzene-sulfon-halide and one molecule of nitro-benzoyl-halide can be condensed on the diamino compound by using equivalent half portions of both nitro compounds.

Alternatively a dinitro-aryl-sulfon-halide can be used instead of a dinitro-aroyl-halide for the first condensation. After reducing the nitro groups, this compound can be condensed with a nitro-benzoyl-halide, a nitro-benzene-sulfon-halide or with both halides.

The naphthalene nucleus may be and preferably is substituted by one or two sulphonic acid groups. It may also be substituted by one or more alkyl, alkoxy and halogen groups.

The aroyl nucleus of the di-nitro-aroyl-halide or di-nitro-aryl-sulfon halide may be substituted or unsubstituted benzene or naphthalene nucleus. The aryl nucleus of the nitro-aroyl halide and the nitro-aryl-sulfon halide may be a substituted or unsubstituted benzene, naphthalene or di-phenyl nucleus. These aryl nuclei may be substituted by one or more alkyl, alkoxy and halogen groups, such as methyl, ethyl, propyl, butyl, methoxy, ethoxy, chloro, bromo, iodo, fluoro and even longer chain alkyl and alkoxy groups.

The temperatures, concentrations and conditions for the condensations and the reductions can be varied and modified according to the usual practices which are understood in the art, and other suitable reducing agents besides iron can be used.

The compounds of the invention which are substituted in the naphthol group by sulphonic acid are represented generally by the formula

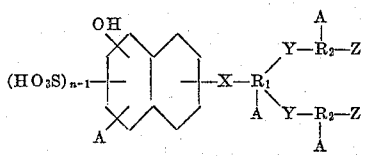

in which $R_1$ is the residue of a benzene or naphthalene compound, $R_2$ is the residue of a benzene, naphthalene or di-phenyl compound, X and Y are radicals selected from the group NH—C=O and NH—SO$_2$ the X's and Y's being alike or unlike, Z is nitro or amino, A is hydrogen, alkyl, alkoxy or halogen, and $n$ is 2 or 3.

The compounds are designated generally as di(nitro-aroyl-amino) aroyl - amino - naphthols, di(nitro - aryl - sulfonyl - amino) aroyl - amino-naphthols, di(nitro-aroyl-amino) aryl-sulfonyl-amino-naphthols, di(nitro-aryl-sulfonyl-amino) aryl-sulfonyl-amino-naphthols and as di(amino-aroyl-amino) aroyl-amino-naphthols, di(amino-aryl-sulfonyl-amino) aroyl-amino-naphthols, di(amino-aroyl-amino) aryl-sulfonyl-amino-naphthols, and di(amino-aryl-sulfonyl-amino) aryl-sulfonyl-amino-naphthols.

The preferred end products are the di(amino-aroyl-amino)-aroyl-amino-naphthols in which the aroyl nuclei are from benzene, and of these 3:5 - di(4' - nitro - benzoyl - amino) - benzoyl-2-amino-5-naphthol-7-sulfonic acid and the product obtained by reduction of the nitro groups to free amino groups are mentioned as being particularly useful in the preparation of azo dyes.

In making the products in which one or more of the NH—C=O groups set forth in the examples is NH—SO$_2$, a di-nitro-aryl-sulfon halide is used instead of a di-nitro-aroyl halide with suitable modifications in the procedures which will effect the condensations and reductions hereinbefore indicated. Instead of the chlorides specified in the examples, any of the halides can be used.

As various other modifications of the invention will be apparent to those skilled in the art without departing from the spirit and scope of the invention it is to be understood that no limitations are intended in the annexed claims except those which are specifically recited or are imposed by the prior art.

We claim:

1. A compound represented by the formula

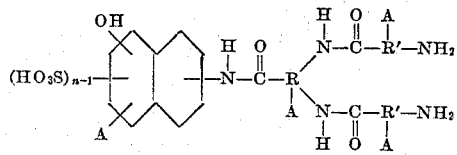

in which $n$ is 2 to 3, R is a hydrocarbon radical of the group consisting of benzene and naphthalene, R' is a hydrocarbon radical of the group consisting of benzene, di-phenyl and naphthalene, and A is at least one of the group consisting of hydrogen, alkyl, alkoxy and halogen.

2. A compound represented by the formula

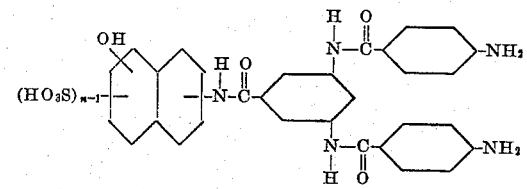

in which $n$ is 2 to 3.

3. The compound represented by the formula

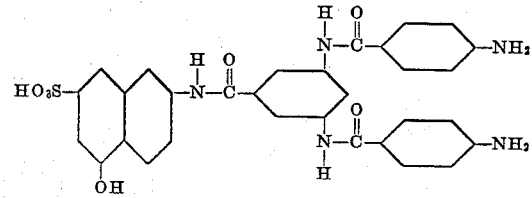

4. 3:5-di(4'-amino-benzoyl-amino)-benzoyl H-acid.

5. 3:5-di(4'-amino-benzoyl-amino)-benzoyl S-acid.

6. The process which comprises condensing a compound represented by the formula

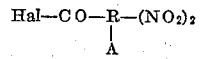

wherein Hal— is halogen, R is a hydrocarbon radical of the group consisting of benzene and naphthalene, A is from a group consisting of hydrogen, alkyl, alkoxy and halogen and the nitro groups are in meta positions to each other; with an amino-naphthol-sulfonic acid represented by the formula

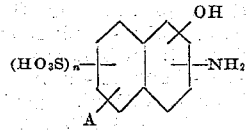

wherein Hal— is halogen, R' is a hydrocarbon alkyl, alkoxy and halogen and $n$ is 1 to 2; reducing the nitro groups to amino; heating one molecular equivalent of the compound thus produced with two molecular equivalents of a compound represented by the formula

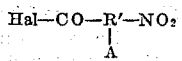

wherein Hal— is halogen, R' is a hydrocarbon radical of the group consisting of benzene, naphthalene and di-phenyl and A is from a group consisting of hydrogen, alkyl, alkoxy and halogen; and then reducing the nitro groups to amino 7. The process which comprises condensing an amino naphthol containing one to two sulfonic acid groups and a meta-dinitro-benzoyl halide, reducing the nitro groups, then condensing the resulting diamine compound with two molecular proportions of a mono-nitro-benzoyl-halide, and reducing the latter of said nitro groups to amino groups.

MARGARET R. EASTLACK, FORMERLY
        MARGARET R. MURPHY,
*Administratrix of the Estate of Arthur R. Murphy, Deceased.*
SWANIE S. ROSSANDER.
CARLTON W. CROCO.
JOHN M. TINKER.